(12) United States Patent
Cheng et al.

(10) Patent No.: US 10,014,553 B2
(45) Date of Patent: Jul. 3, 2018

(54) ELECTROLYTE FORMULATIONS FOR LITHIUM ION BATTERIES

(71) Applicant: Wildcat Discovery Technologies, Inc., San Diego, CA (US)

(72) Inventors: Gang Cheng, San Diego, CA (US); Ye Zhu, San Diego, CA (US); Deidre Strand, San Diego, CA (US); Boutros Hallac, Franklin, WI (US); Bernhard M. Metz, Glendale, WI (US)

(73) Assignees: WILDCAT DISCOVERY TECHNOLOGIES, INC, San Diego, CA (US); JOHNSON CONTROLS TECHNOLOGY COMPANY, Holland, MI (US)

( * ) Notice: Subject to any disclaimer, the term of this patent is extended or adjusted under 35 U.S.C. 154(b) by 0 days.

(21) Appl. No.: 15/588,517

(22) Filed: May 5, 2017

(65) Prior Publication Data
US 2017/0244130 A1   Aug. 24, 2017

Related U.S. Application Data

(62) Division of application No. 14/746,737, filed on Jun. 22, 2015, now Pat. No. 9,653,755.

(51) Int. Cl.
| | | |
|---|---|---|
| H01M 10/056 | (2010.01) | |
| H01M 10/0567 | (2010.01) | |
| H01M 10/0525 | (2010.01) | |
| H01M 10/0568 | (2010.01) | |
| H01M 10/052 | (2010.01) | |

(52) U.S. Cl.
CPC ....... *H01M 10/056* (2013.01); *H01M 10/052* (2013.01); *H01M 10/0525* (2013.01); *H01M 10/0567* (2013.01); *H01M 10/0568* (2013.01)

(58) Field of Classification Search
CPC .......................... H01M 10/052; H01M 10/056
USPC ........................................................ 429/199
See application file for complete search history.

(56) References Cited

U.S. PATENT DOCUMENTS

| | | | |
|---|---|---|---|
| 6,379,846 B1 * | 4/2002 | Terahara | H01M 6/168 |
| | | | 252/62.2 |
| 2006/0208701 A1 | 9/2006 | Mikhaylik | |
| 2007/0218364 A1 | 9/2007 | Whitacre et al. | |
| 2012/0288771 A1 | 11/2012 | Lim et al. | |
| 2014/0011081 A1 | 1/2014 | Ahn et al. | |
| 2014/0023936 A1 | 1/2014 | Belharouak et al. | |
| 2015/0064568 A1 | 3/2015 | Yushin et al. | |
| 2015/0194704 A1 * | 7/2015 | Garsuch | H01M 4/505 |
| | | | 429/338 |

FOREIGN PATENT DOCUMENTS

| | | | | |
|---|---|---|---|---|
| KR | 1020140098447 A | 8/2014 | | |
| WO | WO 2014012980 A1 * | 1/2014 | ............ | H01M 4/505 |
| WO | 2015053558 A1 | 4/2015 | | |

OTHER PUBLICATIONS

Yan, et al., "Tris(trimethylsilyl)phosphate: A film-forming additive for high voltage cathode material in lithium-ion batteries", Journal of Power Sources, 248 (2014), 1306-1311.

* cited by examiner

*Primary Examiner* — Basia Ridley
*Assistant Examiner* — James Erwin
(74) *Attorney, Agent, or Firm* — Corridor Law Group, P.C.

(57) ABSTRACT

Electrolyte solutions including additives or combinations of additives that provide low temperature performance and high temperature stability in lithium ion battery cells.

24 Claims, 4 Drawing Sheets

ELECTROLYTE FORMULATIONS FOR LITHIUM ION BATTERIES

CROSS-REFERENCE TO RELATED APPLICATIONS

The present application is a divisional of co-pending U.S. non-provisional patent application Ser. No. 14/746,737 filed on Jun. 22, 2015 entitled "Electrolyte Formulations for Lithium Ion Batteries."

BACKGROUND OF THE INVENTION

The present invention is in the field of battery technology and, more particularly, electrolyte formulations that enable both low temperature and high temperature operation of lithium ion batteries.

Certain applications for lithium ion batteries require wide operating temperature ranges. In general, the power capability of lithium ion batteries suffers at low temperature due to one or more of the following factors: 1) an increase in viscosity of the electrolyte resulting in slower lithium ion diffusion; 2) a decrease in the ionic conductivity of the electrolyte; 3) a decrease in ionic conductivity of the solid electrolyte interphase (SEI) on the anode; and 4) a decrease in the diffusion rate of lithium ions through the electrode materials, especially the anode materials.

In the past, solutions to the problems associated with operating a lithium ion battery at low temperature have involved adding solvents that have very low melting points and/or low viscosity to the electrolyte formulation. Such additional solvents can help prevent the electrolyte solution from freezing or having substantially increased viscosity at low temperatures. However, such additional solvents tend to be detrimental to the high temperature performance of a lithium ion battery, and in particular the high temperature stability on cycling or storage.

Certain of the shortcomings of known electrolyte formulations are addressed by embodiments of the invention disclosed herein by, for example, improving power performance at low temperature without substantially decreasing high temperature stability on storage.

BRIEF SUMMARY OF THE INVENTION

According to certain embodiments of the invention, electrolyte formulations include a lithium salt, an organic solvent, and an additive. The additive includes an additive salt selected from the group consisting of carbonates, perchlorates, hexafluorophosphates, oxalates, and nitrates. The additive salt is different from the lithium salt.

In some embodiments, the additive salt is lithium carbonate, sodium carbonate, or potassium carbonate. In some embodiments, the additive salt is lithium perchlorate or sodium perchlorate. In some embodiments, the additive salt is sodium hexafluorophosphate or cesium hexafluorophosphate. In some embodiments, the additive salt is lithium oxalate, sodium oxalate, cesium oxalate, or 1-(4,5-dihydro-1,3-thiazol-2-yl)piperidine oxalate. In some embodiments, the additive salt is sodium nitrate or cesium nitrate. In some embodiments, lithium bis(oxalato)borate, cesium nitrate, maleic anhydride, tris(trimethylsilyl)phosphate, trimethylsilyl polyphosphate, 4-fluorophenyl isocyanate, 1,4-butane sultone is included as a second additive.

DETAILED DESCRIPTION OF THE INVENTION

Figure 1B:
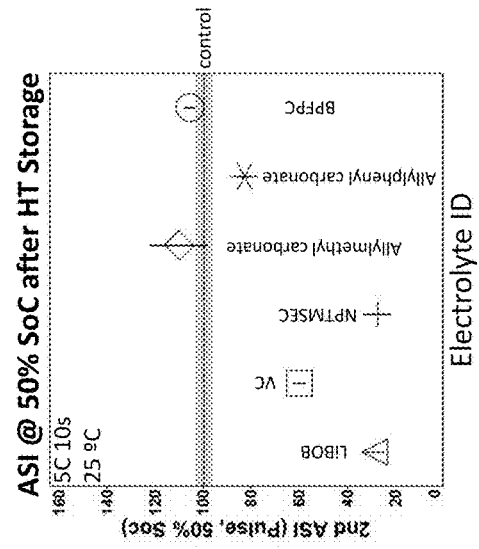
FIGS. 1A and 1B illustrate low temperature and high electrochemical performance characterization of battery cells assembled to contain electrolyte solutions made from formulations of certain embodiments of the invention and control electrolyte solutions.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at room temperature (about 25 degrees C.), unless the context clearly dictates otherwise.

Ranges presented herein are inclusive of their endpoints. Thus, for example, the range 1 to 3 includes the values 1 and 3 as well as intermediate values.

The term "NMC" refers generally to cathode materials containing $LiNi_xMn_yCo_zO_w$, and includes, but is not limited to, cathode materials containing $LiNi_{0.33}Mn_{0.33}Co_{0.33}O_2$.

A lithium ion battery implemented in accordance with embodiments of the invention includes an anode, a cathode, and a separator that is disposed between the anode and the cathode. The battery also includes an electrolyte formulation, which is disposed between the anode and the cathode. An electrolyte formulation can include one or more solvents and one or more lithium-containing salts. Examples of conventional solvents include nonaqueous electrolyte solvents for use in lithium ion batteries, including carbonates, such as ethylene carbonate, dimethyl carbonate, ethyl methyl carbonate, propylene carbonate, methyl propyl carbonate, and diethyl carbonate.

The operation of the lithium ion battery is based upon intercalation and de-intercalation of lithium ions into and from the host materials of the anode and the cathode. Other implementations of the battery are contemplated, such as those based on conversion chemistry. The voltage of the battery is based on redox potentials of the anode and the cathode, where lithium ions are accommodated or released at a lower potential in the former and a higher potential in the latter.

Examples of other suitable cathode materials include phosphates, fluorophosphates, fluorosulfates, fluorosilicates, spinels, lithium-rich layered oxides, and composite layered oxides. Further examples of suitable cathode materials include: spinel structure lithium metal oxides (e.g., $LiMn_2O_4$), layered structure lithium metal oxides (e.g., $LiNi_xMn_yCo_zO_2$), lithium-rich layered structured lithium metal oxides (e.g., $Li_2MnO_3$—$LiNi_xMn_yCoO_2$), lithium metal silicates (e.g., $Li_2FeSiO_4$), lithium metal phosphates (e.g., $LiFePO_4$), metal fluorides, metal oxides, sulfur, and metal sulfides. Examples of suitable anode materials include conventional anode materials used in lithium ion batteries, such as lithium, graphite ("$Li_xC_6$"), and other carbon, silicon, or oxide-based anode materials.

In many lithium ion batteries using conventional electrolyte formulations, components within the electrolyte solution facilitate the in-situ formation of a protective film on or near an electrode during the initial battery cycling. This is referred to as a solid electrolyte interphase (SEI) layer. The anode SEI can inhibit further reductive decomposition of the electrolyte components.

In lithium ion batteries, low temperature performance is characterized by measuring the area specific impedance (ASI), which includes contributions due to the electrode materials, the SEI layers formed on those materials, and the bulk electrolyte properties. As this is a measure of impedance, low ASI values are desirable.

High temperature performance is characterized by measuring the change in ASI after storage at elevated temperature. Again, small changes in the ASI after storage are desirable as such small changes would indicate stability of the cell while it is stored at elevated temperature.

At high temperature, stability of the battery cell can become compromised. Instability at high temperature is believed to be due to: 1) increased reactivity of electrolyte with an active material; 2) accelerated decomposition of $LiPF_6$, which generates decomposition products that can be reactive with the both the electrolyte and the electrode active materials. Parasitic reactions driven by the decomposition products can result in loss of cell capacity and further decomposition of any SEI.

Conventional electrolyte formulations with no additives can show good low temperature performance (as shown by low area specific impedance) because thin and/or poor SEIs are formed. Similarly, electrolyte formulations with conventional additives can also show good low temperature performance for the same reason (thin and/or poor SEIs). Thus, acceptable low temperature performance is apparently achieved with certain additives even though these additives are not forming desirable SEIs. Yet, these formulations show very poor high temperature stability (as shown by high area specific impedance after high temperature storage). Thus, apparent acceptable low temperature performance does not translate into acceptable wide operating temperature performance.

Embodiments of electrolyte formulations disclosed herein address the problem of achieving both low temperature power and high temperature stability. Certain electrolyte additives present in the electrolyte formulation provide improvements to low temperature performance and improve or maintain high temperature performance. Without being bound to a particular hypothesis, theory, or proposed mechanism of action, the performance improvement of the additives is due to improvements in the SEI layer, specifically the SEI that forms on the graphite anode in the presence of these additives.

In some embodiments, combinations of additives improve low temperature performance and improve or maintain high temperature performance as compared to conventional electrolyte formulations (with or without conventional additives). Certain combinations disclosed herein can be thought of as being either SEI formers or SEI modifiers, and combinations of these classifications of additives show benefits as demonstrated by the data disclosed herein.

For example, in the class of SEI formers are additives such as lithium bis(oxalate)borate (LiBOB), certain carbonates, 1,4-butane sultone, and maleic anhydride. These SEI formers form passivation layers to protect the graphite anode surface. In contrast, the class of SEI modifiers includes additives that tend to react with pre-formed SEI or precursors of SEI (such as the reductive decomposition product of ethylene carbonate). The SEI modifiers improve the SEI physical properties (e.g., thickness and uniformity) and SEI composition (e.g., the ratio of inorganic to organic species and the ionic content). SEI physical properties and SEI composition determine the high temperature stability and low temperature impedance of the SEI. Generally speaking, SEI formers tend to show thicker SEI at higher additive concentration, which often results in better high temperature stability but worse low temperature power performance (likely due to thicker, higher impedance SEI).

In certain embodiments of additive combinations disclosed herein, SEI modifiers include certain silicon-containing additives, certain inorganic salts, certain activated linear carbonates, and certain isocyanate-containing compounds. The silicon-containing additives may reduce the LiF content of the anode SEI due to high reactivity between silyl ethers and fluorine ions, which would result in anode SEI compositions with a lower ratio of inorganic to organic species. The inorganic salts may alter the ionic content of the SEI. The activated linear carbonates and isocyanates can readily react with precursors of SEI (e.g., reductive decomposition intermediates of ethylene carbonate or LiBOB) to modify the chemical composition of SEI. Thus, by introducing SEI modifiers, formation of a thinner but more thermally stable SEI can be achieved. These SEI modifiers act to improve the anode SEI generated by the SEI formers. However, as demonstrated herein and described below, the classes of SEI formers and SEI modifiers act in specific ways such that it is not obvious which members of each class will work synergistically to provide the desired wide operating temperature performance.

In certain embodiments of additive combinations disclosed herein, the electrolyte formulation includes certain boron-containing additives. The boron-containing additives are often strong electrophiles. In other words, they readily react with reductive decomposition intermediates from solvents and salts on the anode, which may result in a thinner but more thermally stable SEI. Effective boron-containing additives are believed to be highly activated compounds that contain at least one activated B—O bond by either being attached to at least one fluorinated substituent (e.g., fluorinated alkyl chain) or being part of a cyclic moiety.

In some embodiments, the boron-containing additive is a compound represented by structural formula (a):

(a)

where at least one of $R_1$, $R_2$ and $R_3$ includes a fluorine. $R_1$, $R_2$ and are independently selected from the group consisting of substituted $C_1$-$C_{20}$ alkyl groups, substituted $C_1$-$C_{20}$ alkenyl groups, substituted $C_1$-$C_{20}$ alkynyl groups, and substituted $C_5$-$C_{20}$ aryl groups. At least one of the substitutions is a fluorine, and other additional substitutions are possible, include further fluorine substitutions. Preferred embodiments include tris(2,2,2-trifluoroethyl)borate and its derivatives.

In some embodiments, the boron-containing additive is a compound represented by structural formula (b):

(b)

where X is oxygen or carbon and, independently, Y is oxygen or carbon. The remainder of the ring can be unsubstituted or include further substitutions. The ring can have any number of members. Preferred embodiments include certain diboron structures. Preferred embodiments include bis(neopentylglycolato)diboron and bis(trimethylene)diborate.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Battery Assembly. Battery cells were formed in a high purity argon filled glove box (M-Braun, $O_2$ and humidity content <0.1 ppm). A $LiNi_xMn_yCo_zO_2$ (NMC, x+y+z=1) cathode material and a graphite (G) anode material were used. The G:NMC capacity ratio is greater than 1 to help ensure no lithium deposition, particularly at low temperatures (e.g., temperatures less than 25 degrees Celsius). Each battery cell includes the composite cathode film, a polyolefin separator, and composite anode film. Electrolyte formulations were made according to the ratios and components described herein and added to the battery cell.

Electrolyte Solution Formulation. Electrolyte formulas included a lithium salt and a solvent blend. The lithium salt was $LiPF_6$, and was used at a concentration of 1.2M. The formulations typically contained ethylene carbonate (EC), ethyl methyl carbonate (EMC), dimethyl carbonate (DMC), and methyl butyrate (MB) in the ratio EC/EMC/DMC/MB (20/30/40/10 by volume).

Electrochemical Formation. The formation cycle for NMC//G cells was was a 6 hour open circuit voltage (OCV) hold followed by a charge to 4.1V at rate C/10, with a constant voltage (CV) hold to C/20. The formation cycle was completed with a C/10 discharge to 2.5 V. All formation protocols were run at room temperature.

Electrochemical Characterization. Initial area specific impedance (ASI) was measured after setting the target state of charge (SOC) (by discharging the cell at rate of C/10) and then applying a 10 second pulse at a rate of 5 C. Low temperature ASI results were derived as follows: The cell was recharged to 4.1 V at a rate of C/5 at room temperature, with a CV hold at C/10 followed by a one hour OCV hold. Then, the ambient temperature was reduced to –25 degrees Celsius, followed by a 12 hour OCV hold to allow the test system temperature to equilibrate. All discharges to the specified SOC where conducted at –25 degrees Celsius at a rate of C/10, with a one hour rest at the specified SOC. A discharge pulse at 50% SOC was done at a rate of 2 C for 10 seconds, followed by a 40 second rest. ASI was calculated from the initial voltage (Vi) prior to the pulse and the final voltage ($V_f$) at the end of the pulse according to Formula (1), where A is the cathode area and i is the current:

$$ASI(\Omega \cdot cm^2) = \frac{(V_i - V_f) \times A}{i} \qquad (1)$$

After full recharge to 4.1 V at room temperature, the cells were then stored at 60 degrees Celsius at OCV for two weeks. After two weeks the cells were removed from high temperature storage and then allowed to equilibrate to room temperature. The ASI was then measured by the same protocol used to determine initial ASI (after setting the target SOC and then applying a 10 second pulse at a rate of 5 C).

RESULTS

Figure 1A:
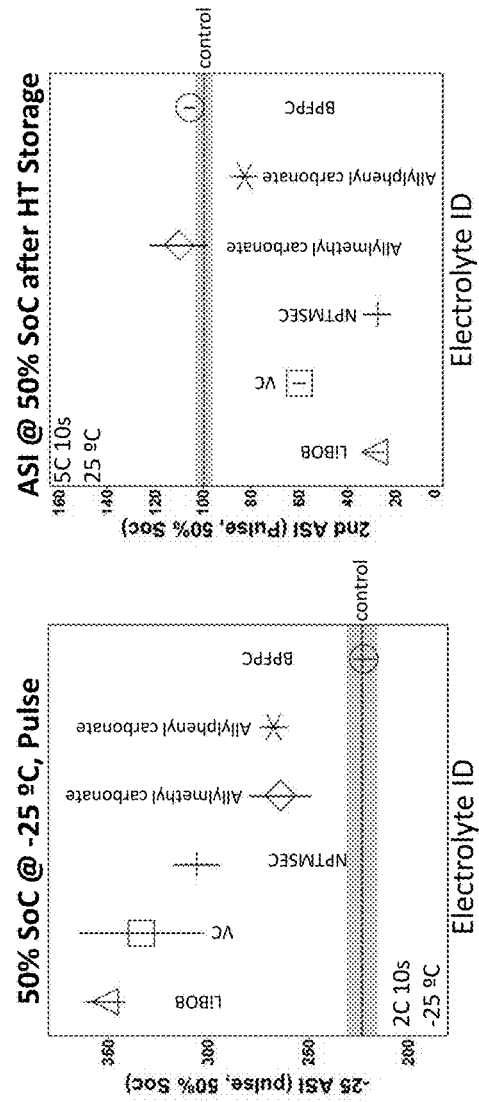

FIGS. 1A and 1B illustrate electrochemical performance characterization of battery cells assembled to contain electrolyte solutions made from formulations of certain carbonate additives as compared to control electrolyte solutions. While vinylene carbonate (VC) is a commonly used SEI additive in lithium ion batteries, other carbonate type additives provide improved low temperature power performance. The presence of strong electron-withdrawing functionality (such as fluorine) showed the best improvements. Specific additives include 4-nitrophenyl-2-trimethylsilyl ethyl carbonate ("NPTMSEC") (structure (c)); allylmethyl carbonate (structure (d)); allylphenyl carbonate (structure (e)); and bis(pentafluorophenyl)carbonate ("BPFPC") (structure (f)):

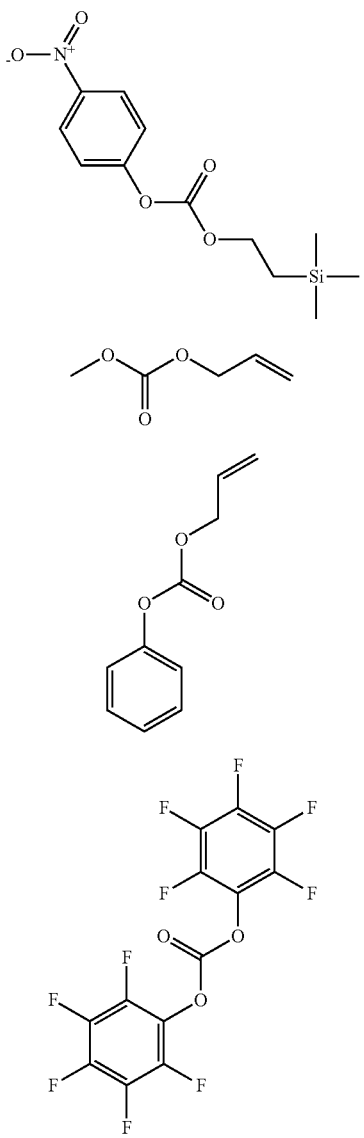

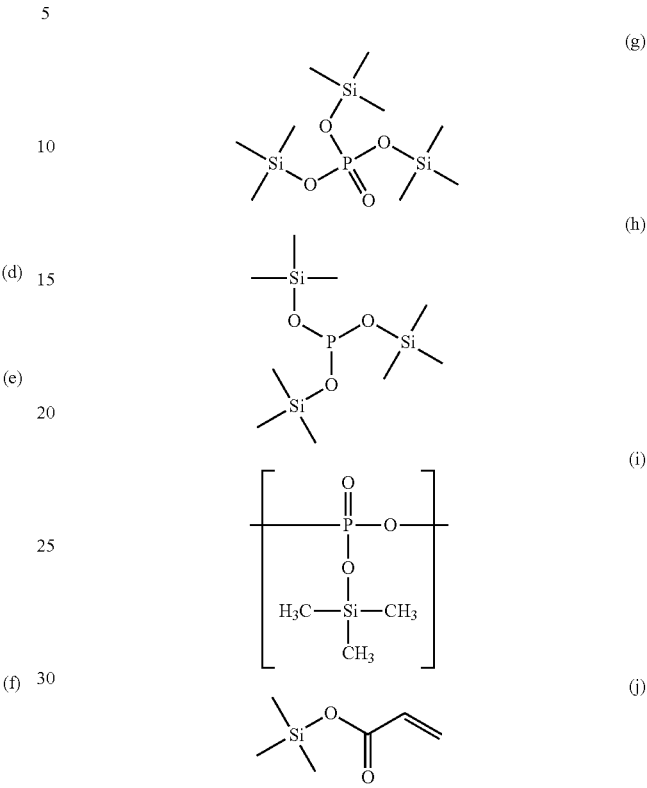

ylsilyl)phosphite ("TTMSPhite") (structure (h)); trimethylsilyl polyphosphate (TMSpoly) (structure (i)); and trimethylsilyl acrylate ("TMSA") (structure (j)):

These additives also improved or maintained high temperature performance relative to VC, as demonstrated in FIGS. 1A and 1B. FIG. 1A shows the area specific impedance (ASI) at low temperature for certain electrolyte formulations containing carbonate additives. The control formulation contains no additives. Two additional control additive formulations are depicted (LiBOB and VC), both of which have higher impedances than the formulations with carbonate additives. FIG. 1B shows data collected after the high temperature storage described herein. Taken together, FIGS. 1A and 1B show that certain carbonate additives improve low temperature performance while maintaining, or not significantly diminishing, the high temperature performance of the system.

Figure 2B:
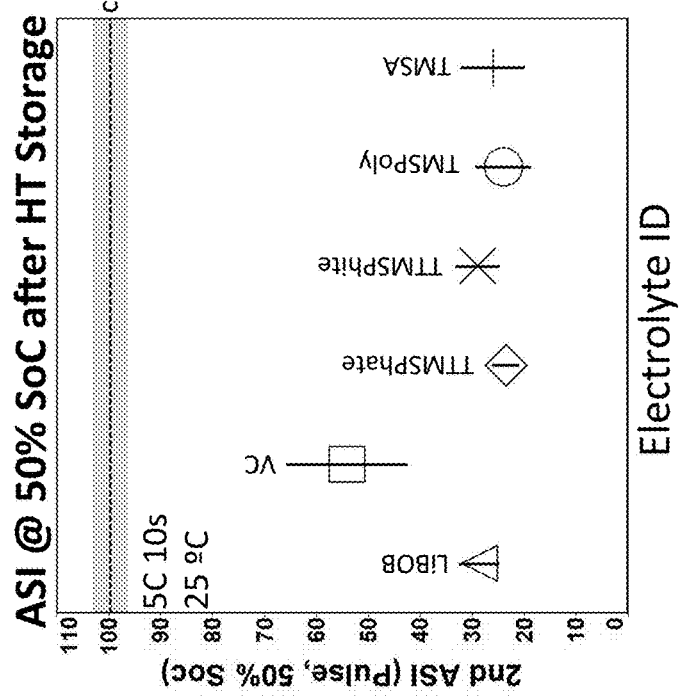
FIGS. 2A and 2B illustrate low and high temperature electrochemical performance characterization of battery cells assembled to contain electrolyte solutions made from formulations of certain embodiments of the invention and control electrolyte solutions.
Figure 2A:
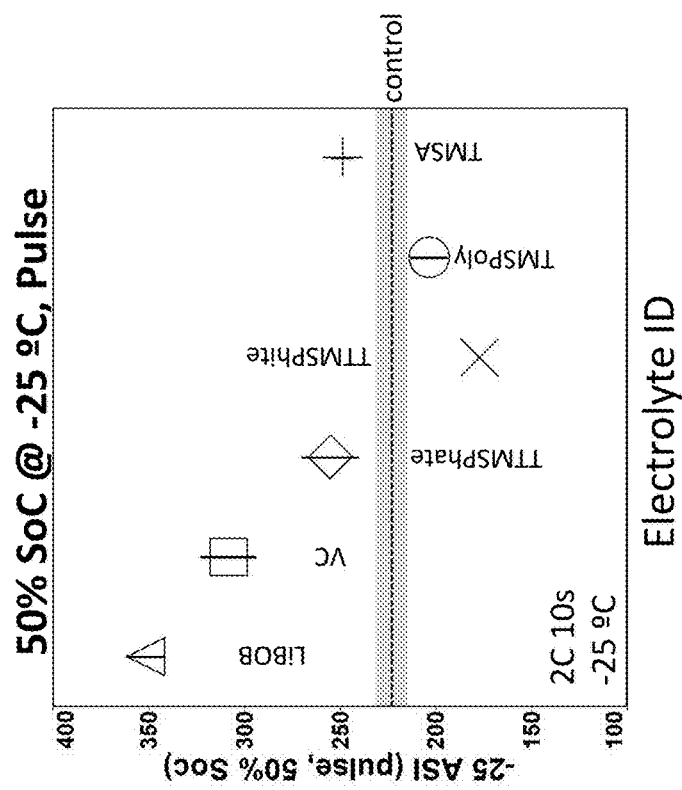

FIGS. 2A and 2B illustrate electrochemical performance characterization of battery cells assembled to contain electrolyte solutions made from formulations of certain silicon-containing additives as compared to control electrolyte solutions. The same controls are used as in FIGS. 1A and 1B. Specific silicon-containing additives include tris(trimethylsilyl)phosphate ("TTMSPhate") (structure (g)); tris(trimethylsilyl)phosphite ("TTMSPhite") (structure (h)); trimethylsilyl polyphosphate (TMSpoly) (structure (i)); and trimethylsilyl acrylate ("TMSA") (structure (j)):

FIG. 2A shows the ASI at low temperature for certain electrolyte formulations including silicon-containing additives. FIG. 2B shows data collected after the high temperature storage described herein. FIGS. 2A and 2B show that certain silicon-containing additives improve low temperature performance while maintaining the high temperature performance of the system.

Figure 3A:
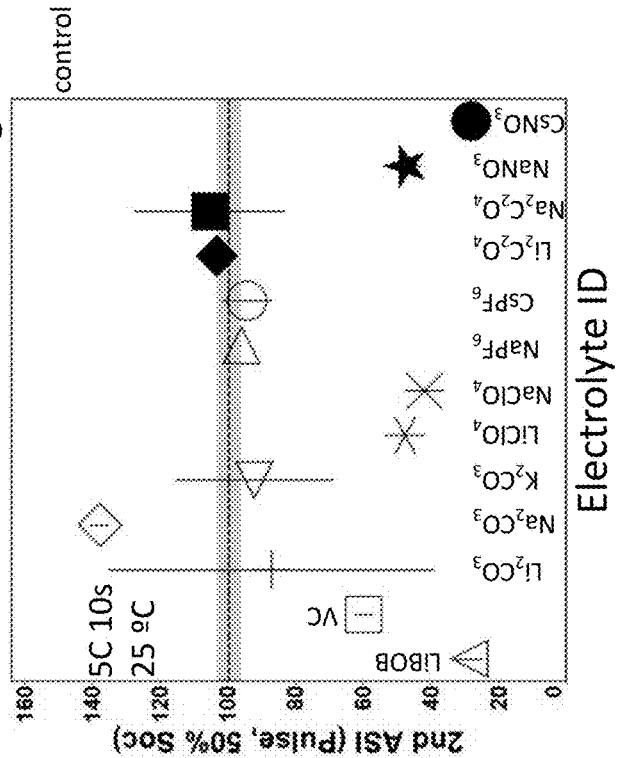
FIGS. 3A and 3B illustrate low and high temperature electrochemical performance characterization of battery cells assembled to contain electrolyte solutions made from formulations of certain embodiments of the invention and control electrolyte solutions.
Figure 3B:
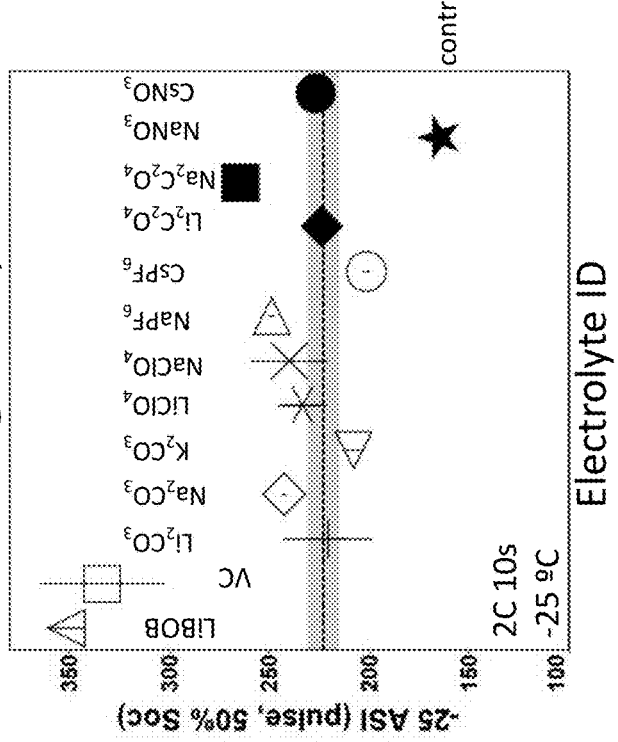

FIGS. 3A and 3B illustrate electrochemical performance characterization of battery cells assembled to contain electrolyte solutions made from formulations of certain inorganic salt additives as compared to control electrolyte solutions. These inorganic salt additives are used in addition to the conventional $LiPF_6$ salt that serves as the lithium ion conductor in the electrolyte. The same controls are used as in FIGS. 1A and 1B. Specific inorganic salt additives include carbonates ($Li_2CO_3$, $Na_2CO_3$, $K_2CO_3$), perchlorates ($LiClO_4$, $NaClO_4$), hexafluorophosphates ($NaPF_6$, $CsPF_6$), oxalates ($Li_2C_2O_4$, $Na_2C_2O_4$), and nitrates ($NaNO_3$, $CsNO_3$). FIG. 3A shows the ASI at low temperature for certain electrolyte formulations including inorganic salt additives. FIG. 3B shows data collected after the high temperature storage described herein. FIGS. 3A and 3B show that certain inorganic salt additives improve low temperature performance while maintaining, or not significantly diminishing, the high temperature performance of the system.

Figure 4B:
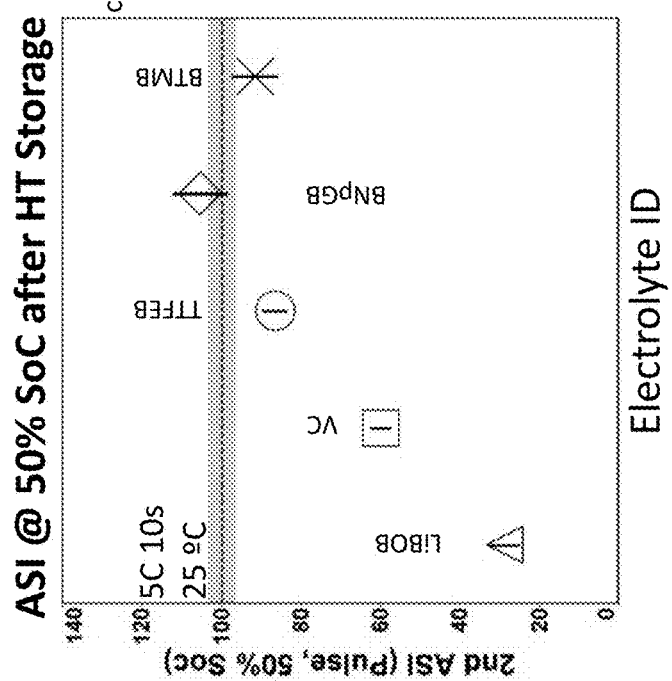
FIGS. 4A and 4B illustrate low and high temperature electrochemical performance characterization of battery cells assembled to contain electrolyte solutions made from formulations of certain embodiments of the invention and control electrolyte solutions.
Figure 4A:
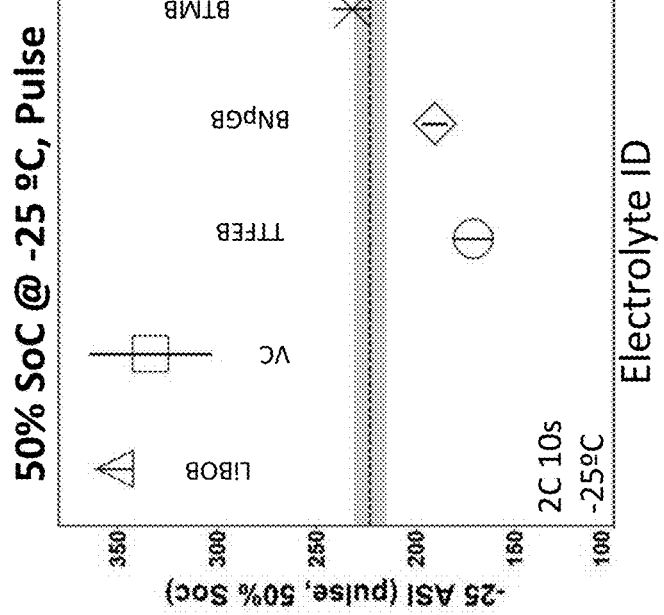

FIGS. 4A and 4B illustrate electrochemical performance characterization of battery cells assembled to contain electrolyte solutions made from formulations of certain boron-containing additives as compared to control electrolyte solutions. The same controls are used as in FIGS. 1A and 1B.

Specific boron-containing additives include tris(2,2,2-trifluoroethyl)borate ("TTFEB") (structure (k)); bis(neopentylglycolato)diboron ("BNpGB") (structure (l)); and bis(trimethylene)diborate ("BTMB") (structure (m)):

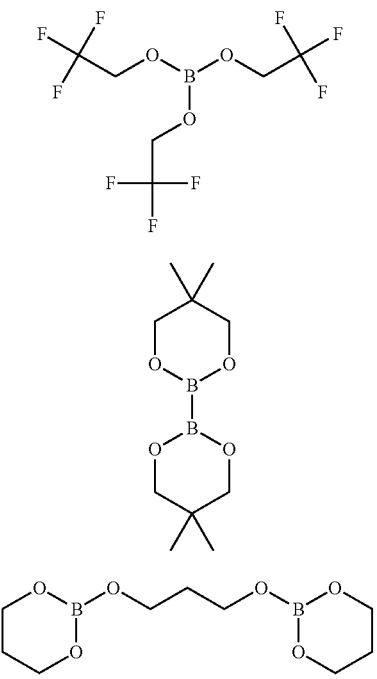

FIG. 4A shows the ASI at low temperature for certain electrolyte formulations including boron-containing additives. FIG. 4B shows data collected after the high temperature storage described herein. FIGS. 4A and 4B show that certain boron-containing additives improve low temperature performance while maintaining, or not significantly diminishing, the high temperature performance of the system.

Area specific impedance is one measure of performance, but it is also important that the additives have no negative effects on initial discharge capacities or coulombic efficiencies. Table 1 presents electrochemical testing for certain additives and demonstrates that the additives generally maintain the electrochemical performance of the controls while improving the wide operating temperature performance (as described in other figures and tables herein). Two types of control electrolytes are included: (i) the electrolyte formulation with no additives and (ii) the electrolyte formulation with control additives VC or LiBOB.

TABLE 1

First cycle capacities and coulombic efficiencies

| Additive | Additive Concentration (%) | Capacity (mAh/cm²) | CE (%) |
|---|---|---|---|
| Control with no additives | 0.0 | 0.99 | 86.1 |
| Control with LiBOB | 0.5 | 1.00 | 85.7 |
| Control with vinylene carbonate | 1.0 | 0.91 | 83.1 |
| bis(pentafluorophenyl) carbonate | 0.5 | 0.93 | 77.8 |
| allyl phenyl carbonate | 0.5 | 1.00 | 86.4 |
| 4-nitrophenyl 2-(trimethylsilyl)ethyl carbonate | 0.5 | 0.95 | 79.6 |
| allyl methyl carbonate | 0.5 | 1.00 | 86.8 |

TABLE 1-continued

First cycle capacities and coulombic efficiencies

| Additive | Additive Concentration (%) | Capacity (mAh/cm²) | CE (%) |
|---|---|---|---|
| tris(trimethylsilyl) phosphate | 0.5 | 0.97 | 88.2 |
| tris(trimethylsilyl) phosphite | 0.5 | 0.99 | 88.1 |
| trimethylsilyl polyphosphate | 0.5 | 0.98 | 86.9 |
| trimethylsilyl acrylate | 2.0 | 1.00 | 88.3 |
| cesium hexafluorophosphate | 0.5 | 1.00 | 88.4 |
| sodium nitrate | 0.5 | 0.99 | 83.2 |
| sodium oxalate | 0.5 | 0.98 | 86.9 |
| cesium nitrate | 0.5 | 0.99 | 85.2 |
| sodium hexafluorophosphate | 0.5 | 0.98 | 87.9 |
| sodium percholorate | 0.5 | 0.98 | 87.7 |
| lithium percholorate | 0.5 | 0.98 | 87.7 |
| potassium carbonate | 0.5 | 1.00 | 88.2 |
| sodium carbonate | 0.5 | 1.01 | 88.3 |
| lithium carbonate | 0.5 | 0.98 | 88.0 |
| lithium oxalate | 0.5 | 0.98 | 86.8 |
| bis(trimethylene)diborate | 0.5 | 0.98 | 86.4 |
| bis(neopentyl glycolato)diboron | 0.5 | 1.01 | 85.9 |
| tris(2,2,2-trifluoroethyl) borate | 0.5 | 0.95 | 85.4 |

Table 2 provides the numerical data that is presented graphically in FIGS. 1A, 1B, 2A, 2B, 3A, 3B, 4A, and 4B.

TABLE 2

Summary of low and high temperature improvements

| Additive | Additive Concentration (%) | Low Temp ASI | 2nd ASI |
|---|---|---|---|
| Control with no additives | 0.0 | 223.0 | 99.7 |
| Control with LiBOB | 0.5 | 351.6 | 28.7 |
| Control with vinylene carbonate | 1.0 | 333.3 | 59.8 |
| bis(pentafluorophenyl) carbonate (BPFPC) | 0.5 | 222.2 | 105.6 |
| allyl phenyl carbonate | 0.5 | 267.4 | 82.7 |
| 4-nitrophenyl 2-(trimethylsilyl)ethyl carbonate | 0.5 | 305.7 | 27.4 |
| allyl methyl carbonate | 0.5 | 263.9 | 110.1 |
| tris(trimethylsilyl) phosphate (TTMSPhate) | 0.5 | 255.2 | 23.5 |
| tris(trimethylsilyl) phosphite (TTMSPhite) | 0.5 | 177.6 | 29.0 |
| trimethylsilyl polyphosphate (TMSpoly) | 0.5 | 203.6 | 24.0 |
| trimethylsilyl acrylate (TMSA) | 2.0 | 248.8 | 26.0 |
| cesium hexafluorophosphate | 0.5 | 201.3 | 94.3 |
| sodium nitrate | 0.5 | 165.9 | 47.9 |
| sodium oxalate | 0.5 | 264.5 | 105.1 |
| cesium nitrate | 0.5 | 227.0 | 28.1 |
| sodium hexafluorophosphate | 0.5 | 248.9 | 96.0 |
| sodium percholorate | 0.5 | 239.9 | 41.9 |
| lithium percholorate | 0.5 | 233.4 | 47.7 |
| potassium carbonate | 0.5 | 208.0 | 92.1 |
| sodium carbonate | 0.5 | 242.4 | 137.7 |
| lithium carbonate | 0.5 | 220.7 | 87.1 |
| lithium oxalate | 0.5 | 223.7 | 103.2 |
| bis(trimethylene)diborate | 0.5 | 232.0 | 91.4 |
| bis(neopentyl glycolato)diboron | 0.5 | 190.3 | 105.2 |
| tris(2,2,2-trifluoroethyl) borate | 0.5 | 171.2 | 86.4 |

While the additives described above can improve low temperature performance without substantially diminishing high temperature stability, certain combinations of these additives with other additives can also provide wide operating temperature performance improvements. Six of the above additives were chosen to combine with other additives: lithium bis(oxalato)borate (LiBOB), 4-nitrophenyl-2-(trimethylsilyl)ether carbonate (NTSEC), CsNO₃, maleic anhydride (MA), tris(trimethylsilyl)phosphate (TTMSPhate), and trimethylsilyl polyphosphate (TMSPoly). Specific additive combinations were tested based on the improvements observed on each individual additive. For example, if a given additive improves low temperature properties while a different additive only improves high temperature properties, the two additives were tested in combination. However, the results from the combinations are not obvious. In other words, combining a given low temperature additive and a given high temperature additive does not necessarily result in a formulation with improved low and high temperature properties.

Table 3 summarizes the performance of the six additives chosen as the primary additive for the combination. These six additives demonstrate high temperature stability improvements over a control electrolyte formulation that contains 1% VC and 0.5% LiBOB. Formulations containing the additive combinations do not include VC or LiBOB with the exception of the target LiBOB combinations.

TABLE 3

Performance improvement of high temperature additives

| High Temperature Additive | Conc. (wt. %) | Cyc1 Capacity (mAh/cm$^2$) | Cyc1 CE (%) | −25 C. ASI | 2nd ASI |
|---|---|---|---|---|---|
| Control - 1% VC + 0.5% LiBOB | | 0.96 | 86.1 | 385 | 35 |
| lithium bis(oxalato)borate | 0.5 | 1.00 | 85.7 | 351.6 | 28.7 |
| 4-nitrophenyl 2-(trimethylsilyl)ethyl carbonate | 0.5 | 0.95 | 80.3 | 309.3 | 28.7 |
| cesium nitrate | 0.5 | 0.99 | 85.2 | 227.0 | 28.1 |
| maleic anhydride | 0.5 | 0.92 | 81.8 | 340.5 | 26.3 |
| tris(trimethylsilyl) phosphate | 0.5 | 0.97 | 88.2 | 255.2 | 23.5 |
| trimethylsilyl polyphosphate | 0.5 | 0.98 | 86.9 | 203.6 | 24.0 |

Surprisingly, as the results presented in Tables 4 through 9 demonstrate, the additves that performed well according to Tables 1 and 2 do not necessarily perform well in when combined with the six additives of Table 3.

Table 4 summarizes first cycle capacity, coulombic efficiency, low temperature performance, and high temperature stability for several low temperature additives with lithium bis(oxalato)borate. Certain of the combinations, but not the majority of the combinations, show improvement over the control in both low temperature and high temperature evaluation.

TABLE 4

Low temperature additives with LiBOB

| Low Temp Additive | Conc. (wt. %) | High Temp 0.5 wt % | Cyc1 Capacity (mAh/cm$^2$) | Cyc 1 CE (%) | −25 C. ASI | 2nd ASI |
|---|---|---|---|---|---|---|
| Control - vinylene carbonate | 0.5 | LiBOB | 0.96 | 86.1 | 385.0 | 35.0 |
| sodium oxalate | 2 | LiBOB | 0.95 | 85.6 | 395.3 | 33.0 |
| sodium percholorate | 0.5 | LiBOB | 0.93 | 87.1 | 348.5 | 34.6 |
| sodium oxalate | 0.5 | LiBOB | 0.93 | 86.0 | 329.3 | 35.3 |
| sodium hexafluorophosphate | 0.5 | LiBOB | 0.96 | 87.6 | 252.1 | 29.4 |
| sodium carbonate | 0.5 | LiBOB | 0.93 | 86.1 | 417.1 | 35.6 |
| potassium carbonate | 0.5 | LiBOB | 0.94 | 87.0 | 364.5 | 32.0 |
| lithium percholorate | 0.5 | LiBOB | 0.91 | 86.6 | 356.3 | 41.4 |
| lithium oxalate | 0.5 | LiBOB | 0.95 | 86.9 | 334.3 | 28.4 |
| lithium carbonate | 0.5 | LiBOB | 0.95 | 87.0 | 369.0 | 33.2 |
| LiTFSI | 0.5 | LiBOB | 0.92 | 85.4 | 308.8 | 43.4 |
| cesium oxalate | 0.5 | LiBOB | 0.92 | 85.7 | 404.3 | 27.7 |
| cesium nitrate | 0.5 | LiBOB | 0.96 | 87.8 | 312.6 | 50.9 |
| tris(pentafluroophenyl) borane | 2 | LiBOB | 0.87 | 78.8 | 351.5 | 45.4 |
| vinylboronic acid 2-methyl-2,4-pentanediol ester | 0.5 | LiBOB | 0.95 | 84.9 | 332.9 | 62.1 |
| tris(2,2,2-trifluoroethyl)borate | 0.5 | LiBOB | 0.91 | 84.2 | 265.2 | 40.0 |
| bis(trimethylene)diborate | 0.5 | LiBOB | 0.93 | 85.7 | 269.7 | 46.1 |
| bis(neopentyl glycolato)diboron | 0.5 | LiBOB | 0.95 | 85.8 | 258.7 | 43.7 |
| diallyl carbonate | 0.5 | LiBOB | 0.95 | 86.3 | 349.3 | 32.8 |
| allyl phenyl carbonate | 0.5 | LiBOB | 0.95 | 86.8 | 374.1 | 26.6 |
| allyl methyl carbonate | 0.5 | LiBOB | 0.94 | 86.6 | 319.9 | 25.2 |
| 4-nitrophenyl 2-(trimethylsilyl)ethyl carbonate | 0.5 | LiBOB | 0.90 | 80.9 | 343.3 | 28.7 |
| N,N-dimethylacetamide | 0.5 | LiBOB | 0.93 | 86.8 | 400.8 | 35.7 |
| 1-methyl-2-pyrrolidinone | 0.5 | LiBOB | 0.90 | 84.7 | 435.2 | 36.5 |
| succinic anhydride | 0.5 | LiBOB | 1.02 | 84.6 | 567.2 | 97.2 |
| ε-caprolactam | 0.5 | LiBOB | 0.96 | 85.6 | 387.5 | 39.3 |
| 4-fluorophenyl isocyanate | 0.5 | LiBOB | 0.92 | 83.4 | 350.1 | 32.8 |
| 3,6-dimethyl-1,4-dioxane-2,5-dione | 0.5 | LiBOB | 0.99 | 87.0 | 534.4 | 101.2 |
| 1,4-butane sultone | 0.5 | LiBOB | 0.98 | 86.4 | 501.2 | 81.9 |

TABLE 4-continued

Low temperature additives with LiBOB

| Low Temp Additive | Conc. (wt. %) | High Temp 0.5 wt % | Cyc1 Capacity (mAh/cm²) | Cyc 1 CE (%) | −25 C. ASI | 2nd ASI |
|---|---|---|---|---|---|---|
| tris(trimethylsilyl) phosphate | 0.5 | LiBOB | 0.89 | 82.8 | 276.4 | 126.8 |
| tris(trimethylsilyl) phosphite | 0.5 | LiBOB | 0.97 | 86.6 | 253.0 | 22.8 |
| trimethylsilyl polyphosphate | 0.5 | LiBOB | 0.97 | 85.4 | 300.5 | 21.9 |
| trimethylsilyl isocyanate | 0.5 | LiBOB | 0.91 | 84.4 | 341.8 | 53.0 |
| N,O-bis(trimethylsilyl)acetamide | 0.5 | LiBOB | 0.98 | 86.6 | 323.9 | 39.4 |
| 1-trimethylsilyl-1,2,4-triazol | 0.5 | LiBOB | 0.93 | 84.7 | 431.6 | 38.0 |
| malachite green oxalate salt | 0.5 | LiBOB | 0.89 | 68.4 | 496.9 | 35.4 |
| 1-(4,5-dihydro-1,3-thiazol-2-yl)piperidine oxalate | 0.5 | LiBOB | 0.95 | 82.0 | 379.1 | 69.1 |

Combinations notable for their wide temperature range performance improvements include LiBOB and: sodium perchlorate, sodium hexafluorophosphate, potassium carbonate, lithium oxalate, lithium carbonate, diallyl carbonate, allyl phenyl carbonate, allyl methyl carbonate, 4-nitrophenyl-2-(trimethylsilyl)ether carbonate, 4-fluorophenyl isocyanate, tris(trimethylsilyl) phosphite, or trimethylsilyl polyphosphate.

Table 5 summarizes first cycle capacity, coulombic efficiency, low temperature performance, and high temperature stability for several low temperature additives with 4-nitrophenyl-2-(trimethylsilyl)ether carbonate. Certain of the combinations, but not the majority of the combinations, show improvement over the control in both low temperature and high temperature evaluation.

TABLE 5

Low temperature additives with NTSEC

| Low Temp Additive | Conc. (wt. %) | High Temp 0.5 wt % | Cyc1 Capacity (mAh/cm²) | Cyc 1 CE (%) | −25 C. ASI | 2nd ASI |
|---|---|---|---|---|---|---|
| Control - vinylene carbonate | 0.5 | LiBOB | 0.96 | 86.1 | 385.0 | 35.0 |
| sodium perchlorate | 0.5 | NTSEC | 0.93 | 80.8 | 354.1 | 35.6 |
| sodium nitrate | 0.5 | NTSEC | 0.91 | 78.8 | 397.7 | 69.3 |
| potassium carbonate | 0.5 | NTSEC | 0.90 | 79.2 | 319.3 | 90.3 |
| lithium perchlorate | 0.5 | NTSEC | 0.90 | 78.1 | 338.5 | 27.2 |
| lithium oxalate | 0.5 | NTSEC | 0.92 | 79.4 | 322.4 | 47.7 |
| lithium carbonate | 0.5 | NTSEC | 0.91 | 78.7 | 315.6 | 114.8 |
| cesium oxalate | 0.5 | NTSEC | 0.93 | 79.8 | 369.4 | 50.3 |
| cesium nitrate | 0.5 | NTSEC | 0.91 | 78.6 | 337.0 | 27.6 |
| vinylboronic acid 2-methyl-2,4-pentanediol ester | 0.5 | NTSEC | 0.92 | 78.8 | 309.5 | 147.2 |
| tris(2,2,2-trifluoroethyl)borate | 0.5 | NTSEC | 0.88 | 76.0 | 302.6 | 116.9 |
| bis(trimethylene) diborate | 0.5 | NTSEC | 0.86 | 66.8 | 337.3 | 87.3 |
| bis(neopentyl glycolato)diboron | 0.5 | NTSEC | 0.93 | 80.3 | 634.6 | 134.1 |
| 2-allyl-5,5-dimethyl-1,3,2-dioxaborinane | 0.5 | NTSEC | 0.88 | 74.5 | 324.8 | 126.6 |
| diallyl carbonate | 0.5 | NTSEC | 0.93 | 80.3 | 356.0 | 102.5 |
| N,N-dimethylacetamide | 2 | NTSEC | 0.90 | 77.6 | 322.2 | 49.3 |
| 1-methyl-2-pyrrolidinone | 0.5 | NTSEC | 0.92 | 79.7 | 332.6 | 35.6 |
| 4-fluorophenyl isocyanate | 0.5 | NTSEC | 0.92 | 79.7 | 317.1 | 38.6 |
| 1,4-butane sultone | 0.5 | NTSEC | 0.91 | 79.6 | 292.1 | 27.9 |
| 1-(4,5-dihydro-1,3-thiazol-2-yl)piperidine oxalate | 0.5 | NTSEC | 0.91 | 66.8 | 342.8 | 50.4 |

Combinations notable for their wide temperature range performance improvements include NTSEC and: lithium perchlorate, cesium nitrate, or 1,4-butane sultone.

Table 6 summarizes first cycle capacity, coulombic efficiency, low temperature performance, and high temperature stability for several low temperature additives with cesium nitrate. Certain of the combinations, but not the majority of the combinations, show improvement over the control in both low temperature and high temperature evaluation.

TABLE 6

Low temperature additives with CsNO₃

| Low Temp Additive | Conc. (wt. %) | High Temp 0.5 wt % | Cyc1 Capacity (mAh/cm²) | Cyc 1 CE (%) | −25 C. ASI | 2nd ASI |
|---|---|---|---|---|---|---|
| Control - vinylene carbonate | 0.5 | LiBOB | 0.96 | 86.1 | 385.0 | 35.0 |
| sodium perchlorate | 0.5 | CsNO₃ | 0.95 | 86.1 | 284.8 | 51.1 |
| sodium nitrate | 0.5 | CsNO₃ | 0.93 | 85.2 | 292.6 | 28.0 |
| potassium carbonate | 0.5 | CsNO₃ | 0.97 | 86.5 | 283.9 | 29.7 |
| lithium perchlorate | 0.5 | CsNO₃ | 0.92 | 83.5 | 299.4 | 89.9 |
| lithium oxalate | 0.5 | CsNO₃ | 0.95 | 85.1 | 301.1 | 40.2 |
| lithium carbonate | 0.5 | CsNO₃ | 0.96 | 85.7 | 273.9 | 28.2 |
| cesium oxalate | 0.5 | CsNO₃ | 0.96 | 86.2 | 263.0 | 47.9 |
| vinylboronic acid 2-methyl-2,4-pentanediol ester | 0.5 | CsNO₃ | 0.93 | 85.8 | 295.7 | 131.5 |
| tris(2,2,2-trifluoroethyl)borate | 0.5 | CsNO₃ | 0.90 | 84.1 | 226.2 | 56.8 |
| bis(trimethylene) diborate | 0.5 | CsNO₃ | 0.93 | 86.3 | 293.7 | 95.4 |
| bis(neopentyl glycolato) diboron | 0.5 | CsNO₃ | 0.95 | 86.1 | 247.6 | 112.1 |

TABLE 6-continued

Low temperature additives with CsNO₃

| Low Temp Additive | Conc. (wt. %) | High Temp 0.5 wt % | Cyc1 Capacity (mAh/cm²) | Cyc 1 CE (%) | −25 C. ASI | 2nd ASI |
|---|---|---|---|---|---|---|
| 2-allyl-5,5-dimethyl-1,3,2-dioxaborinane | 0.5 | CsNO₃ | 0.94 | 86.4 | 270.5 | 139.2 |
| diallyl carbonate | 0.5 | CsNO₃ | 0.94 | 85.7 | 329.2 | 62.5 |
| bis(pentafluorophenyl)carbonate | 0.5 | CsNO₃ | 0.91 | 78.9 | 256.3 | 45.7 |
| N,N-dimethylacetamide | 2 | CsNO₃ | 0.95 | 85.4 | 297.4 | 48.8 |
| 1-methyl-2-pyrrolidinone | 0.5 | CsNO₃ | 0.95 | 86.0 | 315.6 | 36.3 |
| 4-fluorophenyl isocyanate | 0.5 | CsNO₃ | 0.95 | 86.0 | 337.0 | 25.4 |
| 1,4-butane sultone | 0.5 | CsNO₃ | 0.96 | 86.6 | 299.9 | 25.5 |
| 1-(4,5-dihydro-1,3-thiazol-2-yl)piperidine oxalate | 0.5 | CsNO₃ | 0.91 | 78.7 | 356.0 | 90.6 |

Combinations notable for their wide temperature range performance improvements include CsNO₃ and: sodium nitrate, potassium carbonate, lithium carbonate, 4-fluorophenyl isocyanate, or 1,4-butane sultone.

Table 7 summarizes first cycle capacity, coulombic efficiency, low temperature performance, and high temperature stability for several low temperature additives with maleic anhydride. Certain of the combinations, but not the majority of the combinations, show improvement over the control in both low temperature and high temperature evaluation.

TABLE 7

Low temperature additives with MA

| Low Temp Additive | Conc. (wt. %) | High Temp 0.5 wt % | Cyc1 Capacity (mAh/cm²) | Cyc 1 CE (%) | −25 C. ASI | 2nd ASI |
|---|---|---|---|---|---|---|
| Control - vinylene carbonate | 0.5 | LiBOB | 0.96 | 86.1 | 385.0 | 35.0 |
| sodium percholorate | 0.5 | MA | 0.88 | 82.9 | 402.2 | 32.5 |
| sodium nitrate | 0.5 | MA | 0.87 | 80.6 | 487.2 | 57.8 |
| potassium carbonate | 0.5 | MA | 0.91 | 82.6 | 358.8 | 35.8 |
| lithium percholorate | 0.5 | MA | 0.89 | 82.3 | 387.3 | 26.6 |
| lithium oxalate | 0.5 | MA | 0.88 | 81.6 | 336.7 | 33.4 |
| lithium carbonate | 0.5 | MA | 0.90 | 81.8 | 399.9 | 34.5 |
| cesium oxalate | 0.5 | MA | 0.89 | 81.9 | 375.0 | 23.0 |
| cesium nitrate | 0.5 | MA | 0.93 | 81.9 | 390.9 | 33.7 |
| vinylboronic acid 2-methyl-2,4-pentanediol ester | 0.5 | MA | 0.93 | 82.4 | 408.2 | 66.7 |
| tris(2,2,2-trifluoroethyl) borate | 0.5 | MA | 0.90 | 81.6 | 283.6 | 39.8 |
| bis(trimethylene) diborate | 0.5 | MA | 0.89 | 81.4 | 309.9 | 56.5 |
| bis(neopentyl glycolato)diboron | 0.5 | MA | 0.88 | 81.4 | 325.7 | 74.8 |
| 2-allyl-5,5-dimethyl-1,3,2-dioxaborinane | 0.5 | MA | 0.89 | 81.2 | 471.8 | 112.7 |
| diallyl carbonate | 0.5 | MA | 0.90 | 82.1 | 476.0 | 55.0 |
| bis(pentafluorophenyl)carbonate | 0.5 | MA | 0.90 | 79.7 | 402.0 | 29.8 |
| N,N-dimethylacetamide | 2 | MA | 0.89 | 81.9 | 353.4 | 35.5 |
| 1-methyl-2-pyrrolidinone | 0.5 | MA | 0.89 | 81.0 | 351.6 | 62.9 |
| 4-fluorophenyl isocyanate | 0.5 | MA | 0.90 | 79.6 | 367.4 | 65.5 |
| 1,4-butane sultone | 0.5 | MA | 0.89 | 81.6 | 336.8 | 43.2 |
| 1-(4,5-dihydro-1,3-thiazol-2-yl)piperidine oxalate | 0.5 | MA | 0.89 | 79.7 | 410.1 | 39.8 |

Combinations notable for their wide temperature range performance improvements include maleic anhydride and: lithium oxalate or cesium oxalate.

Table 8 summarizes first cycle capacity, coulombic efficiency, low temperature performance, and high temperature stability for several low temperature additives with tris(trimethylsilyl)phosphate. Certain of the combinations, but not the majority of the combinations, show improvement over the control in both low temperature and high temperature evaluation.

TABLE 8

Low temperature additives with TTMSP

| Low Temp Additive | Conc. (wt. %) | High Temp 0.5 wt % | Cyc1 Capacity (mAh/cm²) | Cyc 1 CE (%) | −25 C. ASI | 2nd ASI |
|---|---|---|---|---|---|---|
| Control - vinylene carbonate | 0.5 | LiBOB | 0.96 | 86.1 | 385.0 | 35.0 |
| sodium percholorate | 0.5 | TTMS Phate | 0.95 | 88.2 | 257.9 | 37.8 |
| sodium nitrate | 0.5 | TTMS Phate | 0.93 | 85.8 | 260.8 | 32.4 |
| potassium carbonate | 0.5 | TTMS Phate | 0.95 | 87.2 | 231.0 | 29.6 |
| lithium percholorate | 0.5 | TTMS Phate | 0.95 | 88.3 | 213.7 | 23.3 |
| lithium oxalate | 0.5 | TTMS Phate | 0.95 | 86.4 | 246.2 | 82.0 |
| lithium carbonate | 0.5 | TTMS Phate | 0.94 | 87.2 | 246.2 | 36.7 |
| cesium oxalate | 0.5 | TTMS Phate | 0.96 | 86.6 | 221.4 | 93.4 |
| cesium nitrate | 0.5 | TTMS Phate | 0.92 | 84.5 | 244.5 | 28.5 |
| vinylboronic acid 2-methyl-2,4-pentanediol ester | 0.5 | TTMS Phate | 0.96 | 87.6 | 220.3 | 78.0 |
| tris(2,2,2-trifluoroethyl)borate | 0.5 | TTMS Phate | 0.93 | 83.7 | 170.4 | 94.4 |
| bis(trimethylene) diborate | 0.5 | TTMS Phate | 0.94 | 85.7 | 215.3 | 105.5 |
| bis(neopentyl glycolato)diboron | 0.5 | TTMS Phate | 0.94 | 84.3 | 199.9 | 80.7 |
| 2-allyl-5,5-dimethyl-1,3,2-dioxaborinane | 0.5 | TTMS Phate | 0.94 | 87.1 | 368.8 | 139.8 |
| diallyl carbonate | 0.5 | TTMS Phate | 0.97 | 87.6 | 303.0 | 41.2 |
| bis(pentafluorophenyl)carbonate | 0.5 | TTMS Phate | 0.86 | 76.7 | 303.7 | 128.2 |
| N,N-dimethylacetamide | 2 | TTMS Phate | 0.93 | 85.9 | 255.5 | 115.9 |
| 1-methyl-2-pyrrolidinone | 0.5 | TTMS Phate | 0.90 | 85.8 | 273.8 | 42.9 |
| 4-fluorophenyl isocyanate | 0.5 | TTMS Phate | 0.94 | 83.4 | 279.0 | 50.3 |
| 1,4-butane sultone | 0.5 | TTMS Phate | 0.94 | 87.9 | 234.2 | 38.7 |
| 1-(4,5-dihydro-1,3-thiazol-2-yl)piperidine oxalate | 0.5 | TTMS Phate | 0.93 | 78.0 | 256.9 | 23.2 |

Combinations notable for their wide temperature range performance improvements include tris(trimethylsilyl)phosphate and: sodium nitrate, potassium carbonate, lithium perchlorate, cesium nitrate, or 1-(4,5-dihydro-1,3-thiazol-2-yl)piperidine oxalate (structure (n)).

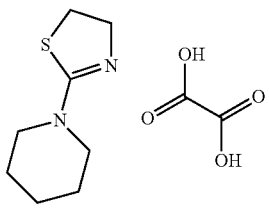

(n)

Table 9 summarizes first cycle capacity, coulombic efficiency, low temperature performance, and high temperature stability for several low temperature additives with trimethylsilyl polyphosphate. Certain of the combinations, but not the majority of the combinations, show improvement over the control in both low temperature and high temperature evaluation.

TABLE 9

Low temperature additives with TMSPoly

| Low Temp Additive | Conc. (wt. %) | High Temp 0.5 wt % | Cyc1 Capacity (mAh/cm$^2$) | Cyc 1 CE (%) | −25 C. ASI | 2nd ASI |
|---|---|---|---|---|---|---|
| Control - vinylene carbonate | 0.5 | LiBOB | 0.96 | 86.1 | 385.0 | 35.0 |
| sodium perchlorate | 0.5 | TMSPoly | 0.93 | 85.5 | 237.8 | 67.7 |
| sodium nitrate | 0.5 | TMSPoly | 0.87 | 78.7 | 228.5 | 103.8 |
| potassium carbonate | 0.5 | TMSPoly | 0.96 | 88.4 | 225.9 | 47.4 |
| lithium perchlorate | 0.5 | TMSPoly | 0.93 | 86.1 | 232.1 | 45.7 |
| lithium oxalate | 0.5 | TMSPoly | 0.95 | 86.1 | 200.9 | 40.7 |
| lithium carbonate | 0.5 | TMSPoly | 0.97 | 89.1 | 189.6 | 23.7 |
| cesium oxalate | 0.5 | TMSPoly | 0.93 | 86.4 | 212.2 | 34.1 |
| cesium nitrate | 0.5 | TMSPoly | 0.94 | 81.7 | 235.5 | 36.1 |
| vinylboronic acid 2-methyl-2,4-pentanediol ester | 0.5 | TMSPoly | 0.91 | 82.6 | 326.4 | 111.7 |
| tris(2,2,2-trifluoroethyl)borate | 0.5 | TMSPoly | 0.92 | 86.3 | 184.5 | 55.7 |
| bis(trimethylene)diborate | 0.5 | TMSPoly | 0.94 | 85.2 | 220.0 | 101.6 |
| bis(neopentyl glycolato)diboron | 0.5 | TMSPoly | 0.93 | 82.1 | 234.2 | 100.3 |
| 2-allyl-5,5-dimethyl-1,3,2-dioxaborinane | 0.5 | TMSPoly | 0.86 | 79.5 | 478.4 | 127.1 |
| diallyl carbonate | 0.5 | TMSPoly | 0.95 | 86.7 | 318.2 | 50.8 |
| bis(pentafluorophenyl)carbonate | 0.5 | TMSPoly | 0.83 | 72.3 | 286.1 | 107.2 |
| N,N-dimethylacetamide | 2 | TMSPoly | 0.87 | 79.0 | 238.9 | 88.7 |
| 1-methyl-2-pyrrolidinone | 0.5 | TMSPoly | 0.87 | 80.1 | 269.4 | 106.9 |
| 4-fluorophenyl isocyanate | 0.5 | TMSPoly | 0.91 | 81.1 | 252.3 | 127.1 |
| 1,4-butane sultone | 0.5 | TMSPoly | 0.94 | 84.6 | 245.4 | 31.2 |

Combinations notable for their wide temperature range performance improvements include trimethylsilyl polyphosphate and: lithium carbonate, cesium oxalate, or 1,4-butane sultone.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. An electrolyte formulation, comprising:
   an organic solvent;
   a lithium salt present at a concentration suitable for conducting lithium ions through the electrolyte formulation; and
   an additive salt comprising sodium oxalate;
   wherein the additive salt is different from the lithium salt.

2. The electrolyte formulation of claim 1 further comprising lithium bis(oxalato)borate as a second additive.

3. The electrolyte formulation of claim 1 further comprising cesium nitrate as a second additive.

4. The electrolyte formulation of claim 1 further comprising maleic anhydride as a second additive.

5. The electrolyte formulation of claim 1 further comprising tris(trimethylsilyl)phosphate as a second additive.

6. The electrolyte formulation of claim 1 further comprising trimethylsilyl polyphosphate as a second additive.

7. The electrolyte formulation of claim 1 further comprising 4-fluorophenyl isocyanate as a second additive.

8. The electrolyte formulation of claim 1 further comprising 1,4-butane sultone as a second additive.

9. An electrolyte formulation, comprising:
   an organic solvent;
   a lithium salt present at a concentration suitable for conducting lithium ions through the electrolyte formulation; and
   an additive salt comprising cesium oxalate, wherein the additive salt is different from the lithium salt.

10. An electrolyte formulation, comprising:
    an organic solvent;
    a lithium salt present at a concentration suitable for conducting lithium ions through the electrolyte formulation; and
    an additive salt comprising 1-(4,5-dihydro-1,3-thiazol-2-yl)piperidine oxalate, wherein the additive salt is different from the lithium salt.

11. The electrolyte formulation of claim 9 further comprising lithium bis(oxalato)borate as a second additive.

12. The electrolyte formulation of claim 9 further comprising cesium nitrate as a second additive.

13. The electrolyte formulation of claim 9 further comprising maleic anhydride as a second additive.

14. The electrolyte formulation of claim 9 further comprising tris(trimethylsilyl)phosphate as a second additive.

15. The electrolyte formulation of claim 9 further comprising trimethylsilyl polyphosphate as a second additive.

16. The electrolyte formulation of claim 9 further comprising 4-fluorophenyl isocyanate as a second additive.

17. The electrolyte formulation of claim 9 further comprising 1,4-butane sultone as a second additive.

18. The electrolyte formulation of claim 10 further comprising lithium bis(oxalato)borate as a second additive.

19. The electrolyte formulation of claim 10 further comprising cesium nitrate as a second additive.

20. The electrolyte formulation of claim 10 further comprising maleic anhydride as a second additive.

21. The electrolyte formulation of claim 10 further comprising tris(trimethylsilyl)phosphate as a second additive.

22. The electrolyte formulation of claim 10 further comprising trimethylsilyl polyphosphate as a second additive.

23. The electrolyte formulation of claim 10 further comprising 4-fluorophenyl isocyanate as a second additive.

24. The electrolyte formulation of claim 10 further comprising 1,4-butane sultone as a second additive.

* * * * *